United States Patent [19]
Robol

[11] Patent Number: 5,878,773
[45] Date of Patent: Mar. 9, 1999

[54] AUXILIARY FLOW PATH VALVE

[75] Inventor: Ronald B. Robol, Sanford, N.C.

[73] Assignee: Essef Corporation, Chardon, Ohio

[21] Appl. No.: 929,696

[22] Filed: Sep. 15, 1997

[51] Int. Cl.⁶ ................................. F16K 11/00
[52] U.S. Cl. .............. 137/112; 137/113; 137/513.5; 137/521; 137/614.21; 137/630.22
[58] Field of Search ............. 137/110, 112, 137/113, 513.5, 521, 614.21, 630.22

[56] References Cited

U.S. PATENT DOCUMENTS

| 683,273 | 9/1901 | Gray ................................. 137/112 |
| 1,580,618 | 4/1926 | Lovequist et al. ............... 137/630.22 |
| 2,266,125 | 12/1941 | Malsbary et al. . |
| 2,561,878 | 7/1951 | Monteverde ................... 137/521 X |
| 2,634,743 | 4/1953 | Audemar . |
| 2,889,690 | 6/1959 | McGrath . |
| 3,756,280 | 9/1973 | Parquet . |
| 4,237,931 | 12/1980 | Rafaely . |
| 4,324,273 | 4/1982 | Bauer et al. . |
| 4,432,215 | 2/1984 | Yoshida . |
| 4,556,077 | 12/1985 | Peyton . |
| 4,852,612 | 8/1989 | Bucko, Sr. . |
| 5,191,915 | 3/1993 | Elmer . |
| 5,247,966 | 9/1993 | Stevens et al. . |
| 5,564,458 | 10/1996 | Roth et al. . |
| 5,634,229 | 6/1997 | Stoltz ................................. 137/521 X |

*Primary Examiner*—Stephen M. Hepperle
*Attorney, Agent, or Firm*—Pearne, Gordon, McCoy & Granger LLP

[57] ABSTRACT

A Flow control valve for a pump suction line permitting flow from an alternate source in the event of partial or complete blockage of a main source. The valve includes a valve housing having a main inlet port at one end, on auxiliary inlet port at its other end and a suction port between the inlet ports. Flow responsive valves are provided at the inlet ports and the valves are spring biased by springs which allow normal flow through the main inlet port. If the main inlet port is blocked the auxiliary port is opened. A flap valve is actuated by flow through the auxiliary port to close the auxiliary port and to create hydrostatic pressure between the blockage and the main inlet port to thereby dislodge the blockage.

7 Claims, 5 Drawing Sheets

AUXILIARY FLOW PATH VALVE

BACKGROUND OF THE INVENTION

This invention relates to suction controlling valves and, more particularly, to a valve for controlling the path of suction flow from a swimming pool main drain and to divert suction flow to an auxiliary flow path upon complete and partial blockage of the swimming pool main drain.

BACKGROUND OF THE INVENTION

Many swimming pools have been constructed with a single suction main drain. Since the main drain is provided at the deepest part of the pool body entrapment by the suction at the drain is a serious problem. An additional drain may be retrofitted to provide an auxiliary flow path to the pump upon blockage of the main drain but considerable suction will still exist at the main drain upon blockage. To overcome the problem the pump suction may be provided with a vacuum switch to shut the pump off in the event of body entrapment, but since pump suction various dramatically from installation to installation each site has to be field adjusted. Additionally the reaction time to shut the flow down is relatively slow.

SUMMARY OF THE INVENTION

This invention provides an auxiliary flow valve that can be factory calibrated for a system flow rate with little or no field calibration and which is quick acting. A particularly important aspect of this invention is that it may be retrofitted into existing pool circulation systems without extensive excavation of the pool area or modification to the pump, filter and piping.

According to this invention a flow control valve for a pump suction line is provided. The valve permits flow from an alternate or auxiliary source in the event of a partial or complete blockage of the main drain of a swimming pool. The valve housing defines a valving chamber having a main inlet port at one end and an auxiliary inlet port at its other end. A suction outlet port is provided between the main inlet port and the auxiliary inlet port. A first flow responsive valve member is provided to control suction flow through the main inlet port and a second flow responsive member is provided to control suction flow through the auxiliary inlet port. The first and second valve members are axially aligned and are spring-biased to seal their respective ports. The spring biasing the valve at the main inlet port is weaker than the spring biasing the valve at the auxiliary inlet port so that suction applied at the suction outlet port will open the main flow responsive valve in preference to the valve at the auxiliary port.

Partial blockage of the main drain will open the auxiliary inlet port slightly to a degree compensating for the reduction of flow through the main drain. Upon complete or a high degree of blockage of the main drain substantially all of the flow will be through the auxiliary port causing the auxiliary port valve to open against the bias of its relatively strong spring. Since the flow at the main inlet port is reduced upon partial or complete blockage of the main inlet port, the main inlet valve is biased to a closed position by its spring. Upon complete or a high degree of blockage of the main inlet port considerable suction at that port remains, since, even though the main inlet port is closed by its spring, seepage around the valve seat maintains suction at that port. However upon complete or a high degree of blockage of the main inlet port the increased flow through the auxiliary inlet port closes a third flow responsive valve member at the auxiliary suction port to substantially eliminate flow at that port.

Closure of the third flow responsive valve pushes the second flow responsive valve member to an open position against the bias of its spring and, through a ridged push rod member mounted for axial movement between the first and second valve members, causes the first flow responsive valve at the main inlet port to be securely sealed against its seat to eliminate seepage at the valve seat. Closure of the first valve member creates positive internal valve chamber pressure between the first valve and the blockage to eject the blockage from the main inlet port. In its resulting condition the first flow responsive valve at the main inlet port is securely sealed to its seat preventing flow therethrough. The second flow responsive valve is maintained in an open position by the third flow responsive valve, but substantial flow is prevented through the auxiliary port since the third flow responsive valve is closed. However a bleed orifice is provided in the third flow responsive valve to permit flow therethrough so that a continuous flow path is available for the pump suction. Once the blockage is removed from the main drain by the aforementioned pressure, the suction in the valve and the limited flow through the bleed orifice is insufficient to maintain the auxiliary port valve in an open position against the bias of its spring. The valve, therefore, resets itself to its normal position prior to main drain blockage.

DETAILED DESCRIPTION OF THE INVENTION

Figure 1:
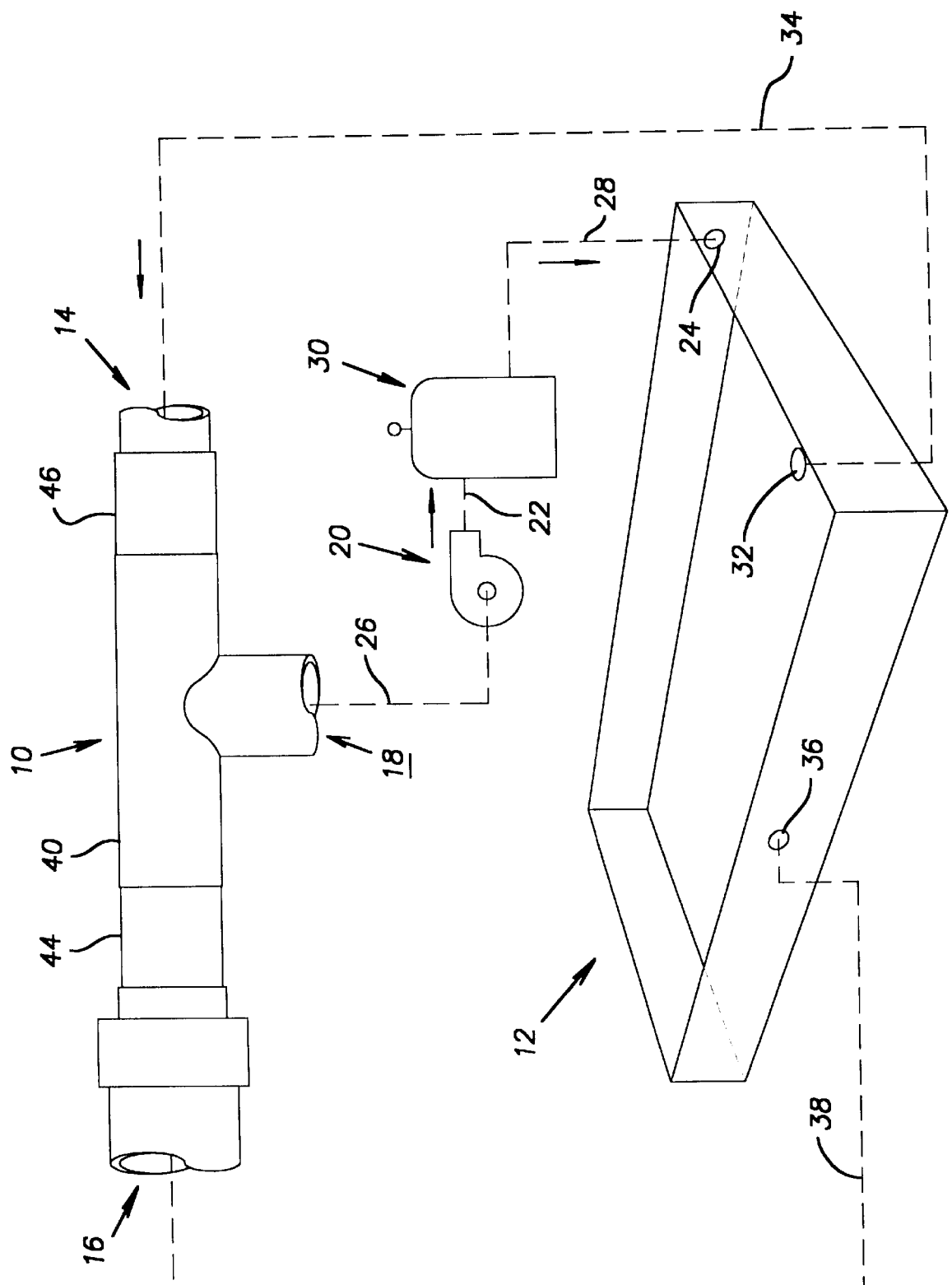
FIG. 1 is a semischematic representation of a flow control valve according to this invention illustrating the valve in a typical water circulation circuit for a swimming pool.

Referring now to FIG. 1, a flow control valve 10 is illustrated. The valve 10 is schematically represented in a typical water circuit for a swimming pool 12. The valve 10 has a main suction inlet 14, an auxiliary inlet 16 and a pump suction outlet 18. Circulation is maintained through the system by a pump 20 having a pump outlet connected by a line 22 to a pool filter 30. The suction side of the pump 20 is connected to the suction outlet 18 of the valve 10 by a line 26. Water is fed from the filter 30 to a pool inlet fitting 24 through a line 28. Water is conducted from the pool 12 at a main drain fitting 32, which, typically, is at the deepest portion of the pool, through a line 34 to the inlet 14. An auxiliary drain 36 is connected to the auxiliary port 16 by a line 38.

Figure 2:
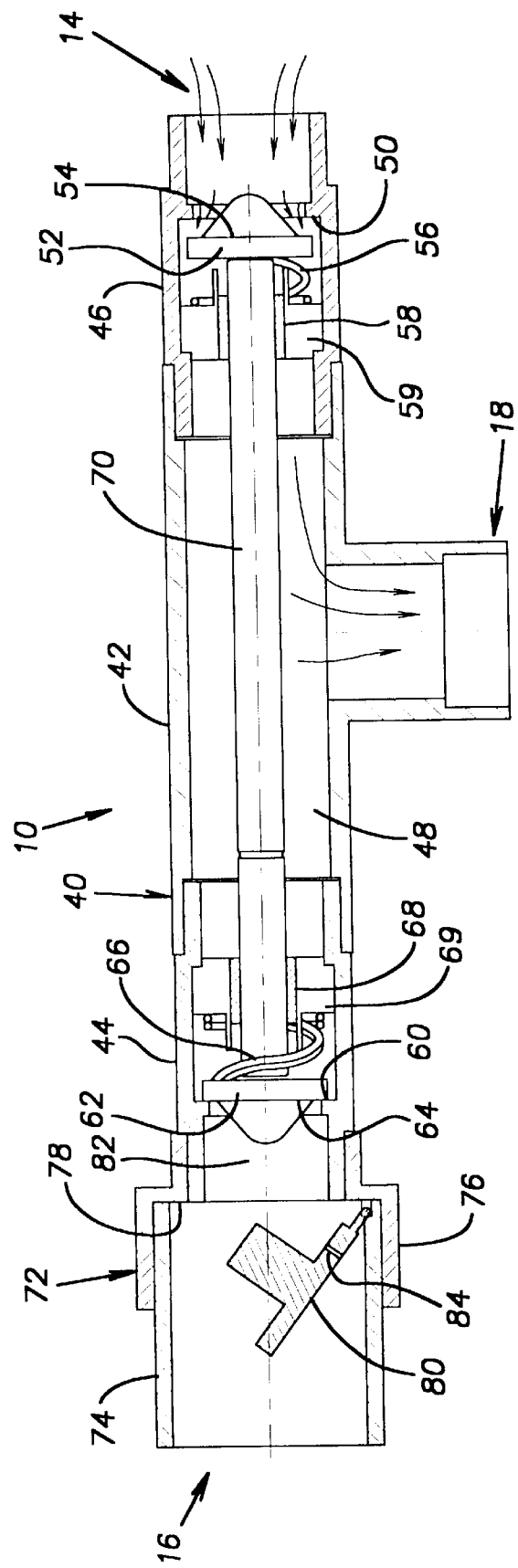
FIG. 2 is a cross sectional view of the valve illustrating the valve in a normal flow condition.

Referring now to FIG. 2 the valve 10 comprises a cylindrical housing 40 which includes a T-shaped body portion 42 and a pair of axially aligned end fittings 44 and 46. The body portion 42 defines a suction chamber 48 and further defines the suction port 18.

The fitting 46 defines an annular valve seat 50 for a first flow responsive valve member 52 which controls suction flow through the main inlet port 14 at one end of the suction chamber 48. The valve member 52 is constructed of a relatively hard elastomeric material and includes a seal surface 54 adapted to cooperate with the valve seat 50. The valve 52 is normally biased toward for the valve seat 54 by a relatively weak main suction flow spring 56 which is compressed between the valve 52 and a cylindrical block 58 having radial fins 59. The fitting 44 defines an annular valve seat 60 for a second flow responsive valve member 62 which controls suction flow through the auxiliary inlet port 16 at the other end of the suction chamber 48. The valve member 62 is constructed of a relatively hard elastomeric material and includes a seal surface 64 adapted to cooperate with the valve seat 60. The valve 62 is normally biased toward the valve seat 60 by a relatively strong auxiliary suction flow spring 66 which is compressed between the valve 62 and a cylindrical block 68 having radial fins 69.

Figure 3:
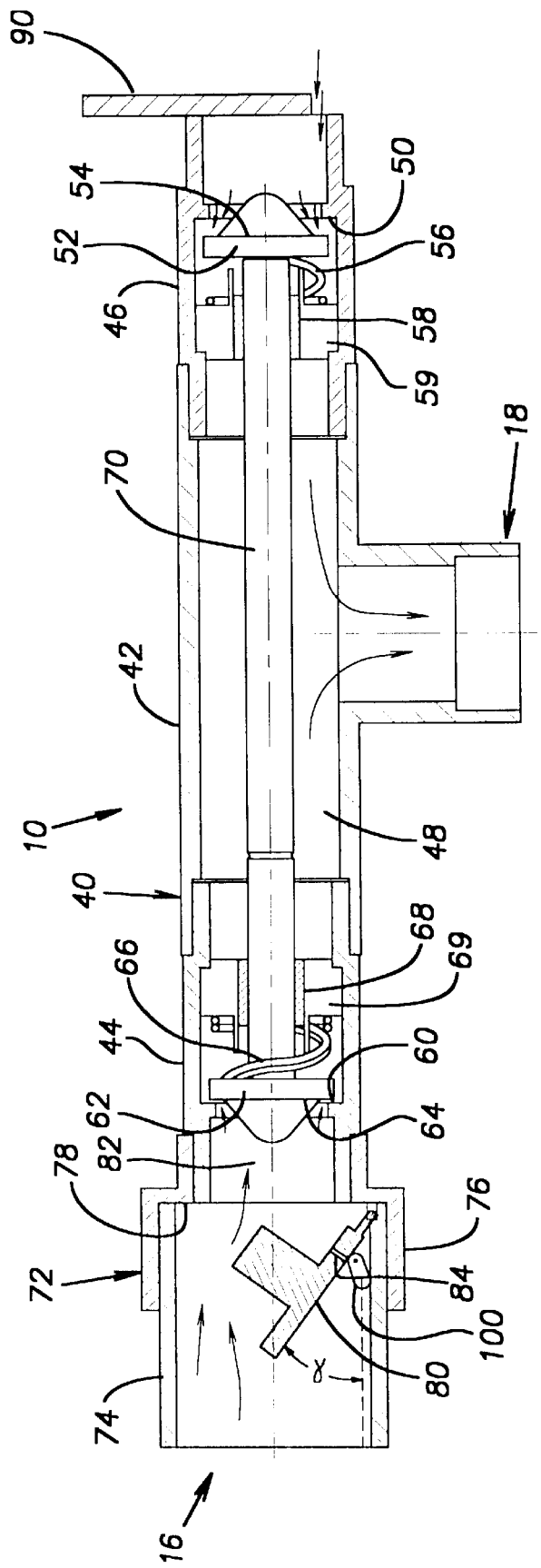
FIG. 3 is a view similar to FIG. 2 but showing the valve in a condition caused by partial blockage of the main inlet port.
Figure 4:
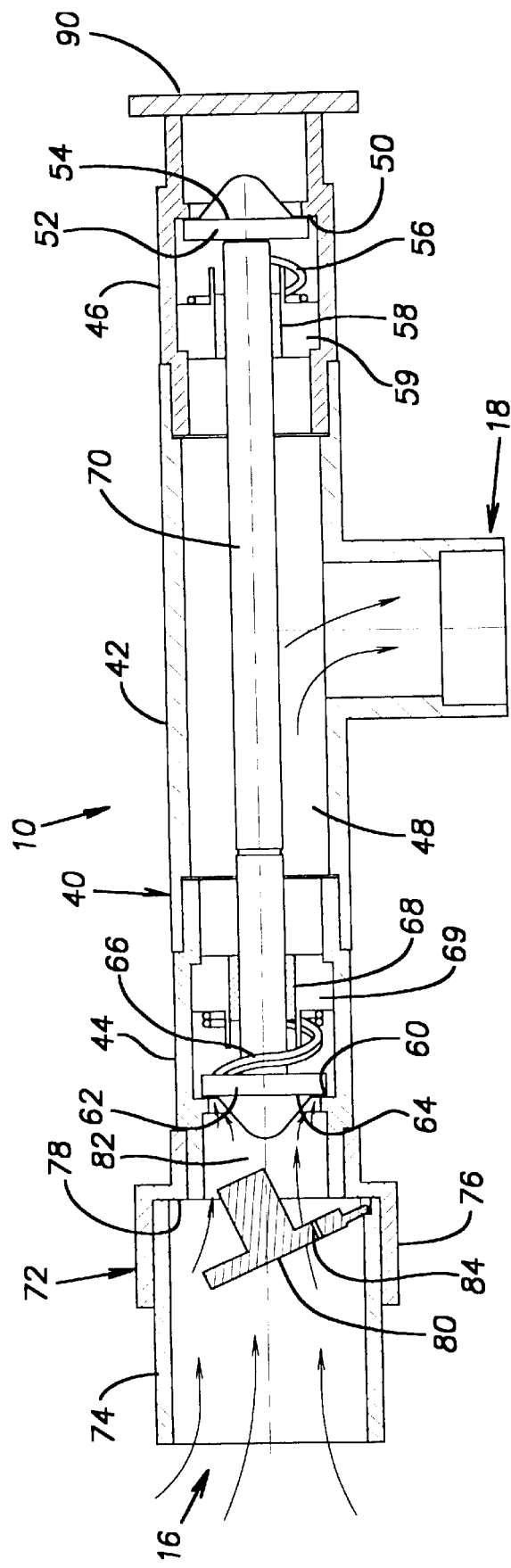
FIG. 4 is a view similar to FIGS. 2 and 3 but showing the valve in a condition immediately after total or a high degree of blockage of the main inlet port.

Axially disposed between the flow control valves 52 and 62 is a safety shut-off push rod 70. The rod 70 has an axial length which will not interfere with normal flow through the main and/or suction inlets as is illustrated in FIGS. 2, 3 and 4. The rod 70 is mounted for axial movement in the blocks 58 and 68.

A flared end fitting 72 is provided on the fitting 44 and includes a tube 74 received within a cup 76. The juncture between the tube 74 and the cup 76 defines a valve seat 78 adapted to cooperate with a flap valve 80. The valve 80 serves as an auxiliary flow shut off and push rod activator as will be described.

Under normal operating conditions, as illustrated in FIG. 2, the pump 20 draws water through the line 26 from the suction port 18. Under normal operating conditions the suction chamber 48 is opened to the main suction port 14 to draw water from the pool through the main drain fitting 32.

Upon partial blockage of the main drain fitting 32, as is illustrated in FIG. 3, the blockage matter 90 limits the flow through the main intake port 14 so that the spring 56 closes the valve 52 to a degree which is proportional to the reduction of flow at the port 14. Since the pump 20 creates the same suction in the chamber 48, whether or not the main drain fitting is blocked, the valve 60 is opened against the bias of the spring 66 to compensate for the reduction of flow through the main intake port 14.

Figure 5:
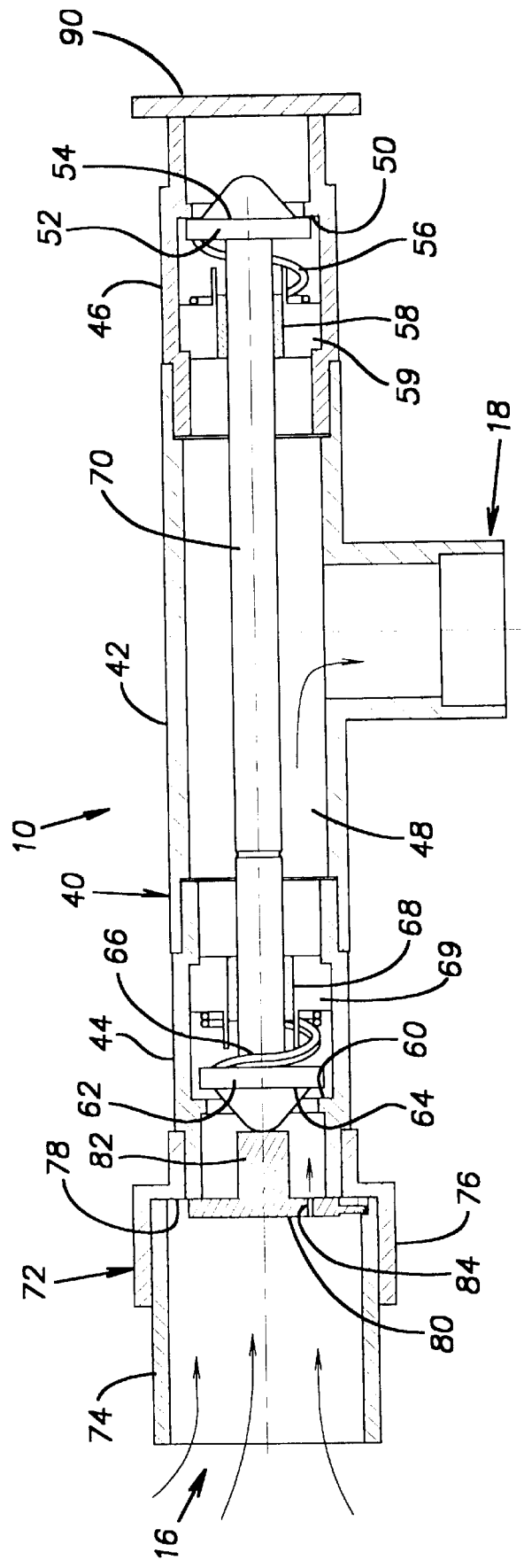
FIG. 5 is a view similar to FIGS. 2–4 but showing the valve in a condition shortly after the condition illustrated in FIG. 4.

Referring now to FIG. 4, complete or near complete blockage of the main drain fitting 32 causes substantially all of the flow to be through the auxiliary intake port 16. Maximum suction exists at the main inlet port 14 since there exists a slight amount of seepage past the valve seat 50. The condition illustrated in FIG. 4 exists for a very short period of time since increased flow at the auxiliary intake port 16 causes the valve 80 to pivot to a closed position illustrated in FIG. 5. Closure of the valve 80 causes an axially projecting tubular portion 82 to contact the valve 62 to move the valve 62 further from its seat 60. It should be noted that the valve 80 may be closed with less than complete blockage of the main drain fitting and such a condition is referred to as "near complete" blockage herein. Closure of the valve 80 is a function of the flow rate (which, in turn is dependent upon the degree of blockage at the main drain fitting 32) and is a function of the angle or at which the valve 80 is positioned relative to the flow direction through the auxilliary inlet port 16. Thus after installation the angle may be adjusted by an externally accessable cam 100 to position the valve 80 to respond to a predetermined amount of blockage. It is to be understood that the term "blocked", as used herein, includes a partially blocked or completely blocked condition at the main drain fitting 32. Movement of the valve 62 causes the rod 70 to shift to the right as viewed in FIG. 5 to transmit a sharp impact to the valve 52. Impacting the valve 52 in this manner causes it to be securely seated on the valve seat 50 and causes the fluid trapped between the valve and the blockage to be compressed so that the blockage is forcibly removed. Once the blockage is removed the valve will return to the condition illustrated in FIG. 2. During the brief period that the valve 80 is closed, a bleed hole 84 is provided to prevent undue momentary strain on the pump 20.

The foregoing description of the invention is illustrative of the preferred embodiment presently contemplated by the inventors, and is not to be construed in a limitive manner. Rather, since the invention is capable of being performed in several manners equivalent to the ones specifically described herein, the scope of the invention is only to be defined by the claims appended hereto.

What is claimed:

1. A flow control valve for a pump suction line permitting flow from an alternate source in the event of partial or complete blockage of a main source comprising a valve housing defining a valving chamber and having a main inlet port at one end of said chamber, an auxiliary inlet port at another end of said chamber, and a suction outlet port between said main inlet port and said auxiliary inlet port; a first flow responsive valve member controlling suction flow through said main inlet port and a second flow responsive suction member controlling suction flow through said auxiliary inlet port, said first and second valve members being axially aligned; first and second springs respectively biasing said first and second flow responsive valves against first and second valve seats, said first spring having a weaker biasing force than said second spring, whereby suction applied at said outlet port will open the first flow responsive valve member to admit suction flow through said main inlet port when said main inlet port is unblocked and will open the second flow responsive valve member to admit suction flow through said auxiliary inlet port when said main inlet port is blocked; a third flow responsive member at said auxiliary suction port permitting flow through said auxiliary suction port when said main inlet port is partially blocked and being moveable to a closed position for restricting suction flow at said auxiliary suction port in response to full flow through said auxiliary suction port upon blockage of said main inlet port; a rigid push rod member mounted for axial movement between said first and second valve members; said third flow responsive member having an axial projection which engages said second flow responsive valve member when said third flow responsive valve member moves into said position restricting suction flow at said auxiliary suction port; said rigid push rod member being axially moved into engagement with said first flow responsive valve member to securely seat said valve member to seal said main inlet port and to create hydrostatic pressure between said first valve member and said blockage to thereby remove said blockage from said main source.

2. A flow control valve according to claim 1 including a mechanism to adjust the closure response of said third flow responsive member as a function of the degree of said blockage.

3. A flow control valve according to claim 1 wherein a bleed port is provided in said third responsive member.

4. A flow control valve according to claim 1 wherein said first and second flow responsive valve members are elastomeric.

5. A flow control circuit for a swimming pool comprising a pump having an output connected to a swimming pool inlet port and an input in fluid communication with a flow control valve, a main swimming pool drain in fluid communication a main inlet port of said valve, an auxiliary swimming pool drain in fluid communication with an auxiliary inlet port of said valve, said valve comprising a valve housing defining a valving chamber and having a main inlet port at one end of said chamber, an auxiliary inlet port at another end of said chamber, and a suction outlet port between said main inlet port and said auxiliary inlet port; a first flow responsive valve member controlling suction flow through said main inlet port and a second flow responsive suction member controlling suction flow through said auxiliary inlet port, said first and second valve members being axially aligned; first and second springs respectively biasing said first and second flow responsive valves against first and second valve seats, said first spring having a weaker biasing force than said second spring, whereby suction applied at said outlet port will open the first flow responsive valve member to admit suction flow through said main inlet port when said main inlet port is unblocked and will open the second flow responsive valve member to admit suction flow through said auxiliary inlet port when said main inlet port is blocked; a third flow responsive member at said auxiliary suction port permitting flow through said auxiliary suction port when said main inlet port is partially blocked and being moveable to a closed position for restricting suction flow at said auxiliary suction port in response to full flow through said auxiliary suction port upon blockage of said main inlet port; a rigid push rod member mounted for axial movement between said first and second valve members; said third flow responsive member having an axial projection which engages said second flow responsive valve member when said third flow responsive valve member moves into said position restricting suction flow at said auxiliary suction port; said rigid push rod member being axially moved into engagement with said first flow responsive valve member to securely seat said valve member to seal said main inlet port and to create hydrostatic pressure between said first valve member and said blockage to thereby remove said blockage from said main source.

6. A flow control valve according to claim 4 wherein a bleed port is provided in said third flow responsive member.

7. A flow control valve according to claim 4 wherein said first and second flow responsive valve members are elastomeric.

* * * * *